United States Patent
West

(10) Patent No.: US 9,160,173 B2
(45) Date of Patent: Oct. 13, 2015

(54) PHOTOVOLTAIC INVERTER WITH SWINGING LINE FILTER INDUCTORS

(71) Applicant: Richard Travis West, Ragged Point, CA (US)

(72) Inventor: Richard Travis West, Ragged Point, CA (US)

(73) Assignee: RENEWABLE POWER CONVERSION, INC., San Luis Obispo, CA (US)

( * ) Notice: Subject to any disclaimer, the term of this patent is extended or adjusted under 35 U.S.C. 154(b) by 126 days.

(21) Appl. No.: 13/940,193

(22) Filed: Jul. 11, 2013

(65) Prior Publication Data

US 2015/0016162 A1    Jan. 15, 2015

(51) Int. Cl.
| | |
|---|---|
| *H02M 7/21* | (2006.01) |
| *H02J 3/38* | (2006.01) |
| *H02M 1/12* | (2006.01) |
| *H02M 7/48* | (2007.01) |
| *H02M 7/538* | (2007.01) |

(52) U.S. Cl.
CPC ............... *H02J 3/383* (2013.01); *H02M 1/126* (2013.01); *H02M 7/48* (2013.01); *H02M 7/538* (2013.01)

(58) Field of Classification Search
USPC ........................................ 323/906; 363/74, 77
See application file for complete search history.

(56) References Cited

U.S. PATENT DOCUMENTS

| | | | | |
|---|---|---|---|---|
| 7,138,728 | B2 * | 11/2006 | LeRow et al. .................... | 307/30 |
| 8,537,581 | B2 * | 9/2013 | Wagoner et al. ................ | 363/95 |
| 2005/0281067 | A1 * | 12/2005 | Deng et al. ..................... | 363/131 |
| 2008/0084721 | A1 * | 4/2008 | Miramonti et al. ............. | 363/89 |
| 2011/0273917 | A1 * | 11/2011 | Maitra et al. .................... | 363/74 |
| 2012/0051101 | A1 * | 3/2012 | El-Barbari et al. ............. | 363/49 |
| 2012/0087159 | A1 * | 4/2012 | Chapman et al. ............... | 363/41 |
| 2013/0076150 | A1 * | 3/2013 | Wagoner et al. ................ | 307/82 |
| 2013/0201733 | A1 * | 8/2013 | Divan et al. ..................... | 363/39 |

* cited by examiner

*Primary Examiner* — Emily P Pham

(57) ABSTRACT

The invention is a high efficiency single-phase or poly-phase DC-to-AC power converter apparatus and power conversion method which includes a line filter inductor or line filter inductors to integrate or filter pulse modulated waveforms into substantially sinusoidal waveforms wherein (i) the line filter inductor or inductors have inductance values that swing substantially from zero current to peak rated current and (ii) a pulse width modulation technique is used that varies both pulse width modulation duty cycles and periods as a function of the predicted instantaneous line filter inductance and the predicted di/dt across the line filter inductor or inductors in order to minimize power converter switching losses while maintaining AC power quality. With the invention, substantial CEC power conversion efficiency enhancements should be achievable and with an overall reduction in power converter parts cost.

15 Claims, 3 Drawing Sheets

PHOTOVOLTAIC INVERTER WITH SWINGING LINE FILTER INDUCTORS

BACKGROUND OF THE INVENTION

The most important solar power converter performance parameter is power conversion efficiency. The cost of a photovoltaic power system using power converters with conversion efficiencies of 97% verses 98% translates to an additional 1% in total system costs with respect to the cost of energy over the lifetime of the system. In addition, a 97% verses 98% efficient power converter would require a cooling system with 50% more heat removal capacity making it larger, heavier and significantly more expensive. This burden is an important consideration in state-of-the-art multi-megawatt system designs that use a number of smaller distributed DC-to-AC power converters cooled only by natural convection.

BRIEF SUMMARY OF THE INVENTION

The invention is a high efficiency single-phase or polyphase DC-to-AC power converter apparatus and power conversion method which includes a line filter inductor or line filter inductors to integrate or filter pulse modulated waveforms into substantially sinusoidal waveforms wherein (i) the line filter inductor or inductors have inductance values that swing substantially from zero current to peak rated current and (ii) a pulse width modulation technique is used that varies both pulse width modulation duty cycles and periods as a function of the predicted instantaneous line filter inductance and the predicted di/dt across the line filter inductor or inductors in order to minimize power converter switching losses while maintaining AC power quality.

DETAILED DESCRIPTION OF THE INVENTION

Figure 1:
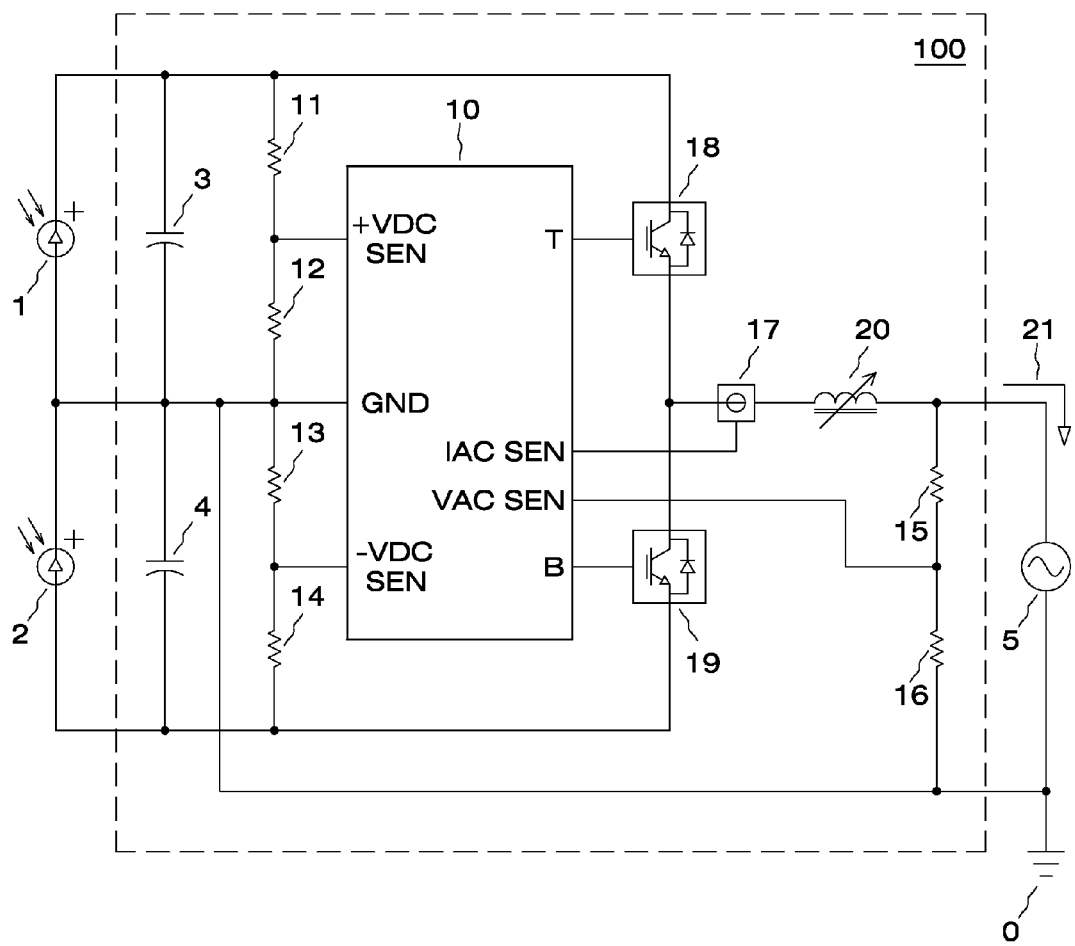
FIG. 1 is an electrical schematic of a simple grid-interactive, bipolar photovoltaic to single-phase power converter and power system intended as a reference for FIGS. 2 and 3.

FIG. 1 is a simplified electrical schematic of a grid-interactive, photovoltaic to single-phase power converter and power system. Power is converted by power converter 100 from solar photovoltaic sources 1 and 2. Electric power grid 5 is a 60 Hz sinusoidal voltage source. Power converter 100 regulates sinusoidal current 21 in phase with electric power grid 5 voltage to achieve positive power transfer into electric power grid 5. Photovoltaic sources 1 and 2 are collectively configured as a bipolar source having both positive and negative voltage potentials with respect to common system ground point 0. Electric power grid 5 is also referenced to common system ground point 0. In most applications where power is converted from a bipolar photovoltaic source, a three-phase power converter (inverter) will be used. For this example, a single-phase inverter is discussed for simplicity.

In FIG. 1, DC bus capacitors 3 and 4 are connected in parallel with photovoltaic sources 1 and 2, respectively, to provide a low AC impedance for the half bridge semiconductor switching matrix configured from IGBT/diode combination 18 and IGBT/diode combination 19. Control circuit 10 has four inputs, (i) positive DC voltage sense, +VDC SEN, which reads the voltage of photovoltaic source 1 with respect to system ground point 0 by way of a voltage divider configured from resistors 11 and 12, (ii) negative DC voltage sense, −VDC SEN, which reads the voltage of photovoltaic source 2 with respect to system ground point 0 by way of a voltage divider configured from resistors 13 and 14, (iii) AC line voltage sense, VAC SEN, which reads the voltage of electric power grid source 5 with respect to system ground point 0 by way of a voltage divider configured from resistors 15 and 16 and (iv) AC line current 21, shown with a positive sense into electric power grid 5, IAC SEN, is provided by current sensor 17. The control circuit ground is shown as GND. Control circuit 10 has two outputs, T, a drive to switch top IGBT 18 on and off and B, a drive to switch bottom IGBT 19 on and off. The common point of this half bridge semiconductor switching matrix is connected through swinging inductor 20. Other semiconductor power switch types could be substituted for IGBTs 18 and 19. The circuit in FIG. 1 is shown for reference and is not considered novel with the exception of swinging inductor 20. Typically, other capacitive and inductive line filter components will be included as secondary filter elements but are excluded herein to better focus on the characteristics of primary swinging filter inductor 20. The novelty of the invention lies in the way the four control circuit 10 inputs, +VDC SEN, −VDC SEN, VAC SEN and IAC SEN are used to determine the pulse widths and the pulse periods for drives T and B to best leverage the performance characteristics of swinging inductor 20. Drives T and B are driven as complements, wherein both are never "on" at the same time. A switch is driven on for the "on-time" and driven off for the "off-time" wherein the on-time plus the off-time is referenced herein as the switching period and the on-time divided by the period is referenced herein as the duty cycle. Swinging inductor 20 is designed with soft saturation characteristics and has significantly higher inductance at low currents than at the maximum rated peak current of power converter 100. For reference, inductance swing ratios greater that 2:1 have been proven to be advantageous in the laboratory but all other ratios may also be considered.

Swinging inductor 20 could be designed with a single core material or on a composite core using two different core materials and/or geometries. Swinging inductor 20 could also be a composite element configured from a number of series connected inductors each with separate saturation characteristics such as two separate cores operated in series where the first core may swing to near full saturation at full peak current while the second inductor operates more as a linear element to maintain a minimum inductance at full peak current and/or under fault conditions. Swinging inductor 20 could also be configured on a core having an asymmetric, partial or V-shaped gap.

In broad general terms, the invention can be used to improve the conversion efficiency of a power converter regardless of the semiconductor switching matrix topology. Photovoltaic power conversion efficiency is determined by a standard test procedure used by the California Energy Commission (CEC) wherein the conversion efficiency at six different AC output power levels; 10%, 20%, 30%, 50%, 75% and 100% of rated power (and rated current assuming fixed, nominal electric power grid voltages) and at three different DC bus voltage levels, high, nominal and low, are measured and weighted to calculate the CEC weighted average conversion efficiency.

In photovoltaic power converters, most of the power conversion losses are a result of semiconductor conduction losses and semiconductor switching losses. The invention leverages the properties of the swinging inductor to reduce semiconductor switching losses by dynamically modulating the PWM pulse periods of drives T and B as a function of two parameters, (i) the instantaneous inductance of the swinging inductor and (ii) the anticipated instantaneous voltage across the inductor as the inductor gains energy or losses energy. Collectively, these two parameters predict the di/dt of the inductor under all, normal, non-fault conditions. In a less precise variant of this operational mode, the PWM frequency of drives T and B are modulated as a function of, (i) the average inductance of the swinging inductor, essentially increasing switching period at lower rms output currents when the swinging inductor inductance is higher and (ii) the DC buss voltage, essentially decreasing the switching period when the voltage across the inductor is higher.

In all current source grid-interactive inverters, the line frequency current injected into the grid has superimposed high frequency components at the switching frequency and harmonics thereof, know collectively as ripple current, which must not exceed levels set at each line frequency harmonic per 1547 IEEE Standard for Interconnecting Distributed Resources with Electric Power Systems. When using the invention, the end goal is to regulate the ripple current constituent harmonic amplitudes to just less than the allowed maximum and to do so over a wide range of inductance values and DC bus voltages by dynamically controlling the PWM switching period. All pulse duty cycles and switching period calculations are performed by control circuit 10 with a DSP controller or other micro-controller. The "instantaneous" swinging inductor inductance dL at any instantaneous current di can be calculated by control circuit 10 by sampling IAC SEN and then deriving the inductance from a stored lookup table or approximating equation characterizing the inductance verses current characteristics of the swinging inductor. The di/dt for adding energy to the inductor or for free-wheeling the inductor can be predicted by subtracting the instantaneous electric power grid source 5 voltage $dv_{ac}$ from the appropriate DC bus voltage $V_{dc}$ (via+VDC SEN or −VDC SEN, depending on the operational quadrant) as:

$$di/dt=(V_{dc}-dv_{ac})/dL$$

With this information, the ripple current amplitude can be regulated, switching cycle by switching cycle, under all dynamic operational conditions according to a desired preprogrammed ripple current reference value set by control circuit 10, to just meet the IEEE-1547 requirements. The 60 Hz line current into the electric power grid source 5 is regulated by comparing the IAC SEN to a sinusoidal reference current generated by the control circuit 10. In a preferred operational mode, controller 10 modulates the duty cycle of T or B to regulate the 60 Hz line frequency current and modulates the switching period to regulate the ripple current amplitude. In a second operational variant, both line frequency current and switching frequency ripple current are regulated according to predetermined reference values but as a function of rms values where the switching period of the pulse modulation is invariant within a typical line frequency cycle. In a third operational variant, a combination of both regulation types is used wherein at power converter output currents less than some predetermined level, said second operational variant is used and above this level, switching periods are modulated within a line frequency cycle. In all cases, boundary conditions will be used to supplement pulse formation rules in order to limit the range of PWM switching periods.

In another operational mode for grid-interactive inverters, lookup tables are used to provide feed-forward control as follows; (i) a quasi-static (quasi-static with respect to the switching pulse width dynamics) sinusoidal current reference is established which will regulate the photovoltaic maximum power point voltage and power factor, (ii) at any instant in time, the reference current $di_{ref}/dt$ is looked up or calculated, (iii) the instantaneous inductance, dL, is determined from a lookup table or from an equation as a function of the sampled instantaneous line current $di_{line}$, (iv) the instantaneous Vac and Vdc are sampled to predict $di_{on}/dt$, the on-time di/dt and $di_{off}/dt$, the off-time or free-wheel di/dt when the applicable switch is turned on and off, respectively, in the next switching cycle (iv) the PWM duty cycle can be determined, regardless of the switching period, by requiring the current transition of the current reference to equal the net current transitions as the inductor gains and losses energy according to the following equation:

$$(di_{ref}/dt)(T_{on}+T_{off})=[(di_{on}/dt)(T_{on})]+[(di_{off}/dt)(T_{off})]$$

(v) the PWM period can be approximated by using a look up table with a predetermined reference value for the allowable peak-to-peak ripple $Irip_{pk-pk}$ as a function of the current reference rms value and/or the instantaneous reference value $di_{ref}$ and solving:

$$Irip_{pk-pk}=[(di_{on}/dt)(T_{on})]-[(di_{off}/dt)(T_{off})]$$

A feedback loop will be used in conjunction with this feed-forward method to make fine duty cycle adjustments.

Figure 2:
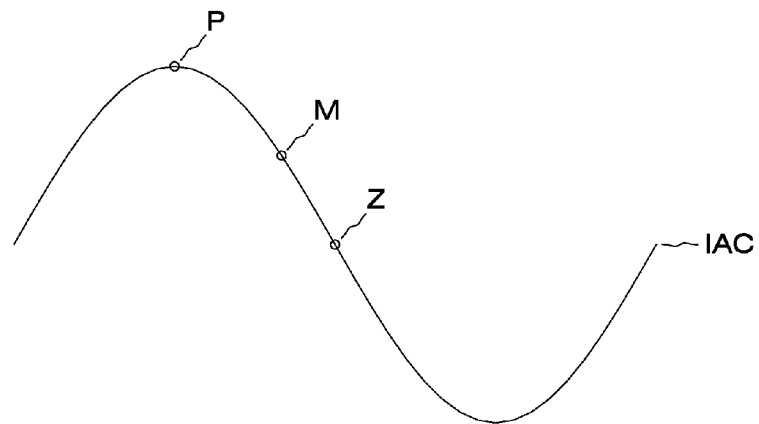
FIG. 2 compares the operational waveforms of a prior art power converter with those of a power converter based on the invention with a swinging inductor and frequency modulated PWM.
Figure 2:
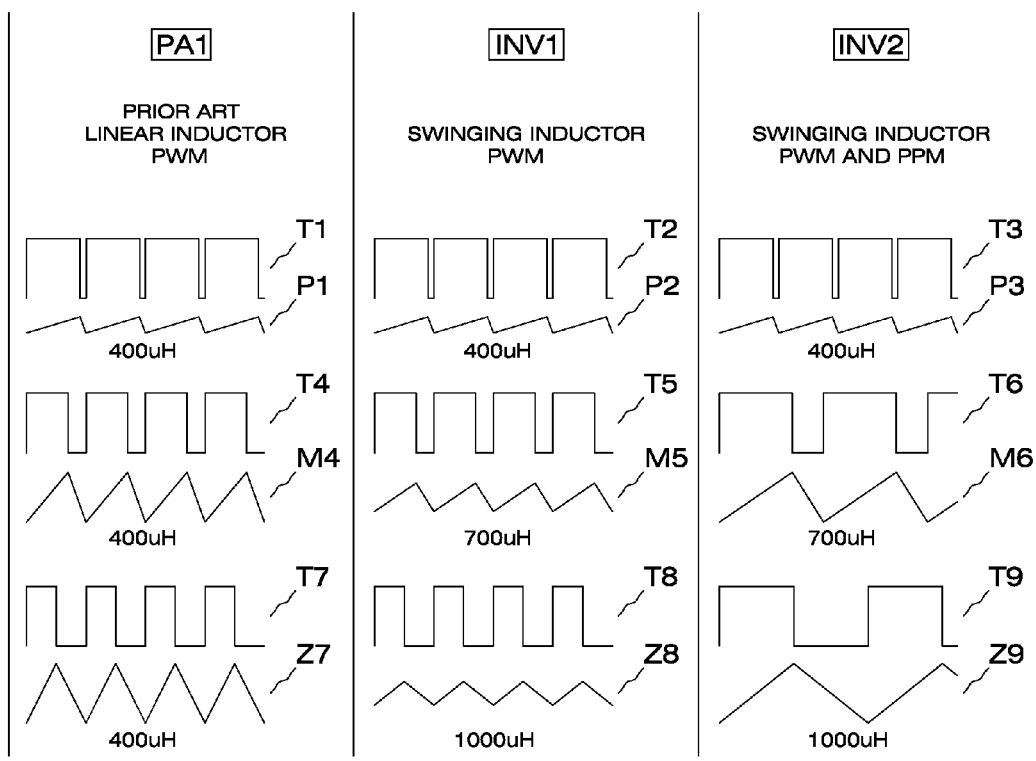

FIG. 2 provides top IGBT drive waveforms, T1-T9, and the resultant current ripple waveforms into an electric power grid, P1-P3, M4-M6 and Z7-Z9. A comparison is made between, a prior-art, grid-interactive DC-to-AC power converter with a linear filter inductor shown in column PA1 and a grid-interactive DC-to-AC power converter based on the invention with swinging inductors in columns INV1 and INV2. FIG. 1 may be used as a reference for a semiconductor switching matrix topology capable of generating these waveforms. IAC is the current into a power grid, as referenced by element 21 in FIG. 1. In FIG. 2, IAC is the full rated current of the power converter and is shown without the switching frequency components (the ripple current). Ripple current waveforms P1-P3, M4-M6 and Z7-Z9, are shown without the line frequency current component and are drawn to three points in the IAC current waveform; peak current, P, median current, M, and the current a zero-cross, Z, respectively. In FIG. 2 the modulation index is high at approximately 0.9. In FIG. 2, all waveforms with reference characters beginning with "T" are top switch IGBT drives (referenced as drive T in FIG. 1).

In FIG. 2, column PA1 shows waveforms for a prior art power converter employing a substantially linear line filter inductor. In this example, an inductance of 400 uH is maintained from peak line current, P1, to zero line current, Z7. Since the inductance is essentially constant with current, the maximum ripple current occurs at zero-cross Z where the inductor di/dt is the highest. In practice, there would be some variations in inductance. An inductance change of less 80% percent at peak current with respect to 100% at no current ($L_0$) is generally considered operating a given inductor as a linear element.

In FIG. 2, column INV1 shows the affect of an inductor with a 2.5:1 inductance swing from no current to peak current. Ripple current M5 amplitudes at median current M and ripple current Z8 at zero-cross Z are substantially lower in response to the same drive signal as in column PA1. In both cases the inductors were designed to maintain a minimum inductance of 400 uH at peak current.

In FIG. 2, column INV2, the top switch drive T3 is unchanged from pulse patterns T1 and T3 because the inductance is the same at IAC operating current P. Drive T6 has the same duty cycle as T4 and T5 but the switching period of the pulses has been lengthened until the amplitude of ripple current M6 is equal to that of M4. In a similar manner drive T9 has the same duty cycle as T7 and T8 but again the starting positions of the pulses have been spread (the switching period lengthened) until the amplitude of ripple current Z9 is equal to that of Z7. It is important to note that in columns PA1 and INV1 the switching frequency remains constant at all three operating points, P, M and Z. In column INV2 the switching frequency is modulated within a 60 Hz, line frequency sub-cycle. As such, the pulse modulation illustrated in column INV1 can be described as fixed frequency PWM (pulse width modulation) whereas the operation illustrated in operation in column INV2 is frequency modulated PWM. The swinging inductor inverter will have two different modes of operation; (i) variable frequency PWM wherein the PWM switching frequency is unchanged within a line frequency cycle and (ii) frequency modulated PWM wherein the switching period is continuously modulated within a line frequency cycle.

Figure 3:
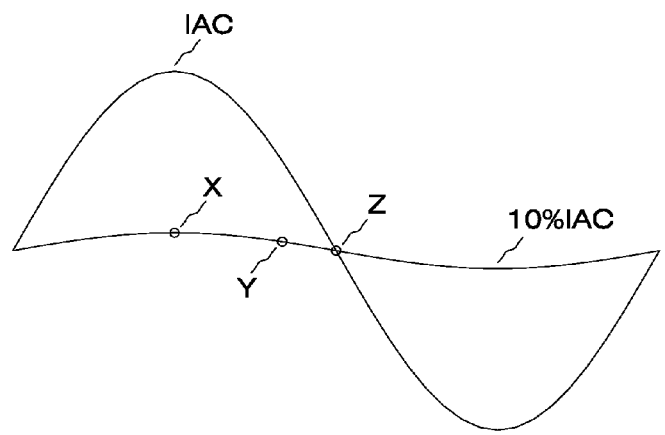
FIG. 3 compares the operational waveforms of a prior art power converter with those of a power converter based on the invention with a swinging inductor and variable frequency PWM.
Figure 3:
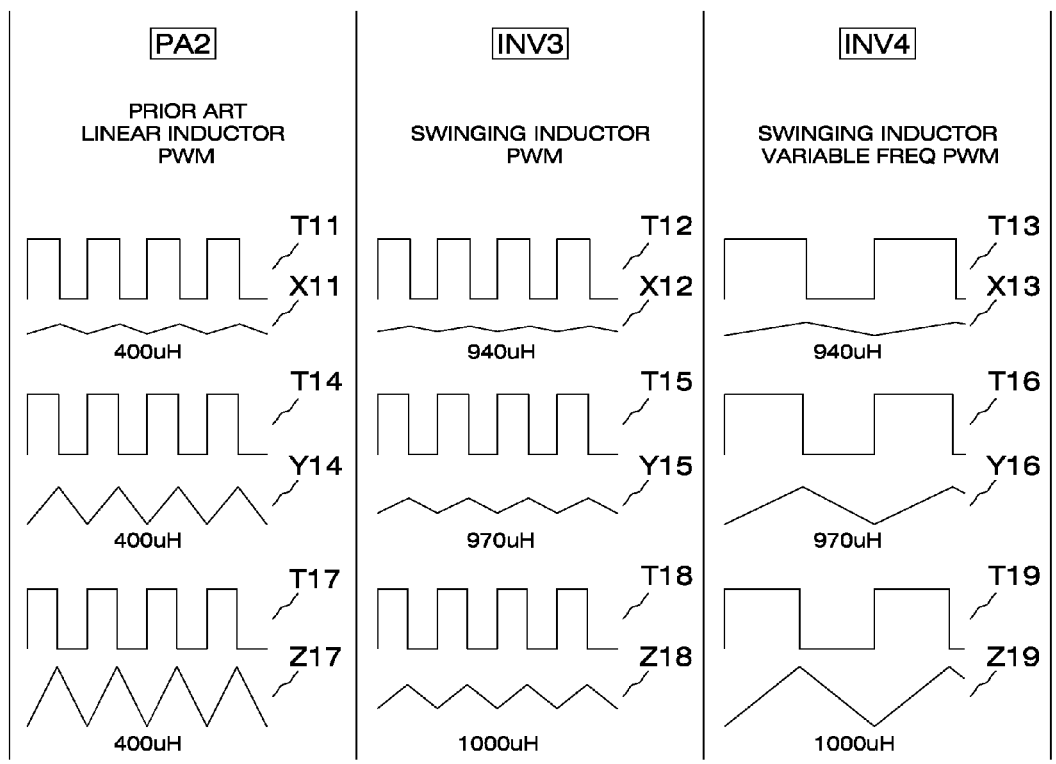

FIG. 3 provides top IGBT drive waveforms, T11-T19, and the resultant current ripple waveforms into an electric power grid, X11-X13, Y14-Y16 and Z17-Z19. A comparison is made between, a prior-art, grid-interactive DC-to-AC power converter with a linear filter inductor shown in column PA2 and a grid-interactive DC-to-AC power converter based on the invention with swinging inductors in columns INV3 and INV4. FIG. 1 may be used as a reference for a semiconductor switching matrix topology capable of generating these waveforms. IAC is the current into a power grid, as referenced by element 21 in FIG. 1. In FIG. 3, 10% IAC is 10% of the full rated current IAC of the power converter and is shown without the switching frequency components (the ripple current). Ripple current waveforms X11-X13, Y14-Y16 and Z17-Z19, are shown without the line frequency current component and are drawn to three points in the 10% IAC current waveform; 10% of peak current X, 5% of peak current, Y, and the current a zero-cross, Z, respectively. In FIG. 3 the modulation index is low at approximately 0.1. In FIG. 3, all waveforms with reference characters beginning with "T" are top switch IGBT drives (referenced as drive T in FIG. 1).

In FIG. 3, column PA2 shows waveforms for a prior art power converter employing a substantially linear line filter inductor. In this example, an inductance of 400 uH is maintained from peak line current, X, to zero line current, Z. Since the inductance is essentially constant with current, the maximum ripple current occurs at zero-cross Z where the inductor di/dt is the highest.

In FIG. 3, column INV3 shows the response of an inductor with a 2.5:1 inductance swing from no current to peak current. At 10% of rated rms current the inductance of the swinging inductor is relatively constant at points X, Y and Z. Regardless, ripple currents X12, Y15 and Y18 are advantageously lower than ripple currents X11, Y14 and Y17, respectively.

In FIG. 3, column INV4, the PWM switching frequency at each point on current waveform 10% IAC is reduced so that the amplitude of ripple currents X13, Y16 and Z19 match the linear inductor ripple currents X11, Y14 and Z17. The inverter operation illustrated in column INV4 would be equivalent to changing the frequency of the triangle wave in a classic analog PWM modulator in contrast to the operation in FIG. 2, column INV2 where the switching period of each pulse is continuously varied so that there is essentially no base frequency to vary.

In both FIGS. 2 and 3, it is demonstrated that with using swinging inductors that ripple currents can be reduced at inverter output current levels less than the peak design currents, switching losses can be reduced or both. The end goal is to maximize inverter power conversion efficiency by minimize power converter switching losses while just meeting power quality harmonic content requirements under all combinations of output current levels and DC bus voltages.

When the inverter is working in a mode where the switching period is continuously modulated within a line frequency cycle or sub-cycle, harmonic intensity at single frequencies are reduced because there is no set fundamental switching frequency so that the energy at all higher switching harmonic frequencies becomes spread-spectrum.

The invention is any DC-to-AC power converter, single-phase or poly-phase, using any semiconductor switching topology or matrix, that include a line filter inductor or line filter inductors to integrate or filter pulse modulated waveforms into sinusoidal waveforms wherein (i) the line filter inductor or inductors have inductance values that swing substantially (more than 1:0.8) from zero current to peak rated current and (ii) use any pulse modulation method that either varies the pulse width modulation periods as a function of any combination of the DC bus voltage, the difference in a DC bus voltage and the instantaneous AC power grid voltage, the instantaneous line filter inductance, the instantaneous AC line current or the rms AC line current.

A partial list of single-phase inverter topologies and poly-phase variants thereof that could benefit from the invention include; basic full bridge, H5, HERIC, topologies with bi-directional semiconductor elements, full bridge with DC bypass, full bridge zero voltage rectifier, neutral point clamp and active neutral point clamp.

The preferred embodiment of the invention is a grid-interactive, bipolar photovoltaic to 3-phase power converter based on a three level neutral point clamp (3LNPC) semiconductor switching topology. The operation of the invention as a 3LNPC was not used in this disclosure because the operation is significantly more complicated and less intuitive. Regardless, all the same principles and benefits of the invention apply to the 3LNPC topology.

The invention is targeted for greatest utility in the solar photovoltaic industry but other power converter applications, such as uninterruptible power supplies could benefit as well.

What I claim as my invention is:

1. A DC-to-AC power converter apparatus comprising an AC line filter inductor with an associated inductance, an arrangement of semiconductor switching devices, a control circuit, a DC input with an associated DC input voltage, an AC output with both an associated AC output voltage and current wherein said DC-to-AC power converter apparatus converts power from a coupled DC source over a range of voltages and wherein said DC-to-AC power converter apparatus sources power to a coupled AC load over a range of AC output voltages and currents and wherein said DC-to-AC power converter apparatus is specified for operation between a minimum rated AC output current and a peak rated AC output current and wherein a ripple current is generated by the power converter apparatus as an artifact of a switch mode power conversion method for said arrangement of semiconductor switching devices and wherein said AC line filter inductor has a non-linear, current-to-inductance characteristic where the inductance of said AC line filter inductor exhibits more than a 20% decrease in said inductance when operating at said peak rated AC output current relative to said inductance when operating at said minimum rated AC output current and wherein said arrangement of semiconductor switching devices comprises at least one semiconductor switch which is driven on for an on-time and driven off for an off-time wherein the on-time plus the off-time is the switching period and wherein the on-time divided by the switching period is the duty cycle and wherein said at least one semiconductor switch which is driven on for the on-time and driven off for the off-time is driven under command of said control circuit in response to at least one of said inductance of said AC line filter inductor, said DC input voltage or said AC output current.

2. The DC-to-AC power converter apparatus according to claim 1 wherein said coupled DC source is a monopolar or bipolar photovoltaic source.

3. The DC-to-AC power converter apparatus according to claim 1 wherein said coupled AC load is a single-phase or poly-phase electric power grid.

4. The DC-to-AC power converter apparatus according to claim 1 wherein said arrangement of semiconductor switching devices is a six-pole, three-phase bridge.

5. The DC-to-AC power converter apparatus according to claim 1 wherein said arrangement of semiconductor switching device is a three-phase, three-level neutral point clamp.

6. The DC-to-AC power converter apparatus according to claim 1 wherein said arrangement of semiconductor switching device is a multi-level power converter.

7. The DC-to-AC power converter apparatus according to claim 1 wherein said semiconductor switching matrix is configured as a single-phase inverter topology and poly-phase variants thereof including; basic full bridge, H5, HERIC, topologies with bi-directional semiconductor elements, full bridge with DC bypass, full bridge zero voltage rectifier, neutral point clamp and active neutral point clamp.

8. The DC-to-AC power converter apparatus according to claim 1 wherein the DC-to-AC power converter apparatus is an uninterruptible power supply and wherein said coupled DC source is a battery and wherein said coupled AC load is collectively any residential, commercial or industrial load or loads.

9. The DC-to-AC power converter apparatus according to claim 1 wherein said duty cycle is modulated and the switching period is fixed.

10. The DC-to-AC power converter apparatus according to claim 1 wherein said duty cycle is modulated and the switching period is modulated.

11. The DC-to-AC power converter apparatus according to claim 3 wherein said duty cycle is modulated to regulate current into said single-phase or poly-phase electric power grid synchronized with said AC output voltage.

12. The DC-to-AC power converter apparatus according to claim 3 wherein said duty cycle is modulated to regulate current into said single-phase or poly-phase electric power grid synchronized with said AC output voltage and wherein said switching period is modulated to regulate an amplitude of said ripple current.

13. A method for converting DC power to AC power at AC power line frequencies using at least one swinging line filter inductor in series or effectively in series with an AC power converter output to integrate or filter pulse modulated waveforms wherein the swinging line filter inductor or inductors have inductance values that swing from a normalized 1.0 reference value at zero current to an inductance value less than 0.8 at a peak rated current and wherein pulse modulation method is used which varies or modulates a period of said pulse modulated waveforms within an AC power line frequency cycle.

14. The method for converting DC power to AC power at AC power line frequencies using at least one swinging line filter inductor in series or effectively in series with an AC power converter output to integrate or filter pulse modulated waveforms according to claim 13 wherein a pulse modulation method is used which varies or modulates the period of said pulse modulated waveforms as a function of any combination of a DC input voltage, an AC output voltage, an instantaneous inductance of the swinging line filter inductor or an AC output current through the swinging line filter inductor.

15. A digital control method for modulating a duty cycle and a period of a switch mode, grid-interactive DC-to-AC power converter comprising the following steps; (i) (predict a voltage that will be across a line filter inductor when a given semiconductor switch is closed), (ii) (predict a voltage that will be across a line filter inductor when a semiconductor switch is opened), (iii) (determine an instantaneous inductance of a line filter inductor), (iv) (using the data from steps i through iii, predict a di/dt of a current through a filter inductor as the filter inductor gains energy and predict the di/dt as the line filter inductor losses energy), (v) (using the data from step iv determine a switch mode duty cycle predicted to track predetermined instantaneous di/dt reference value) and (vi) (using a predetermined ripple current reference value, determine a switch mode switching period).

* * * * *